United States Patent
Takizawa et al.

(10) Patent No.: US 6,896,562 B2
(45) Date of Patent: May 24, 2005

(54) ROTARY ELECTRIC MACHINE AND A METHOD FOR PRODUCING THE SAME

(75) Inventors: Takushi Takizawa, Tokyo (JP); Tomohiko Kuroda, Tokyo (JP); Syuuichi Tamura, Tokyo (JP); Hiroyuki Akita, Tokyo (JP); Atsushi Oohashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/185,011

(22) Filed: Jul. 1, 2002

(65) Prior Publication Data

US 2003/0129856 A1 Jul. 10, 2003

(30) Foreign Application Priority Data

Jan. 10, 2002 (JP) .................................... 2002-003477

(51) Int. Cl.⁷ ................................................ H01R 4/02
(52) U.S. Cl. ................................................... 439/874
(58) Field of Search ................................ 439/424, 874, 439/886

(56) References Cited

U.S. PATENT DOCUMENTS

| | | | | |
|---|---|---|---|---|
| 2,759,161 A | * | 8/1956 | Berg | 439/424 |
| 4,902,867 A | * | 2/1990 | Haramaki et al. | 219/85.18 |
| 5,914,546 A | * | 6/1999 | Terakado et al. | 310/71 |
| 6,369,474 B1 | * | 4/2002 | Tanaka et al. | 310/71 |

FOREIGN PATENT DOCUMENTS

| JP | 9-161937 A | 6/1997 |
|---|---|---|
| JP | 10-4646 | 1/1998 |

* cited by examiner

*Primary Examiner*—Ross Gushi
*Assistant Examiner*—James R. Harvey
(74) *Attorney, Agent, or Firm*—Sughrue Mion, PLLC

(57) ABSTRACT

Joint terminal 21 has segue tubular hole 22, the entire surface of joint terminal 20 is provided with tinning, of which melting temperature is the carbonization temperature of an insulating coating of lead conductors 19d or less, lead conductors 19d are inserted in hole 22, and lead conductors 19d are welded to joint terminal 21 via tin 28 as an jointing ancillary agent, whereby a rotary electric machine and a method for producing the rotary electric machine, in which the jointed portion between the lead conductors and the joint terminal is not deteriorated by temperature, vibration and rust, the insulation is good, reliability of the jointed portion is excellent, are obtainable.

16 Claims, 6 Drawing Sheets

ROTARY ELECTRIC MACHINE AND A METHOD FOR PRODUCING THE SAME

BACKGROUND OF THE INVENTION

1. Field of the Invention

The present invention relates to a rotary electric machine such as an AC generator for vehicle and a method for producing the rotary electric machine, in particular to a processing of a terminal of lead conductor of a stator.

2. Description of Background Art

A three-phase AC generator ordinarily having a rotor of a claw-like magnetic pole type is used for a generator equipped in a vehicle. The AC generator has a structure, for example, disclosed in Japanese Unexamined Patent Publication JP-A-4-168952, such that a three-phase stator coil is wound around a stator core on the stator side, the stator coil has lead conductors, a metallic terminal is attached to the ends of the lead conductors and connected and fixed to a three-phase full wave rectifier located on a bracket. The stator coil is, for example, a polyamide-imide electric wire, being a copper wire having an insulating coating of high heat resistance. The lead conductor is the copper wire, i.e. a single core copper wire elongated from the stator coil. The metallic terminal is made from a metal like copper and jointed to the lead conductor by soldering, caulking with soldering, fusing, or by an equivalent means thereto. The metallic terminal is fixed to the rectifier using a screw or the like.

A rotary electric machine such as an AC generator for vehicle is generally mounted on an engine frame inside an engine room of vehicle, where an atmospheric temperature is high and vibration applied to the engine is strong. In particular, under heavy load, the temperature of a stator coil becomes high by heat caused by generated electric current and the high atmospheric temperature. Therefore, when the lead conductor of the stator coil is jointed to the metallic terminal by soldering as described above, heat deterioration progresses, and the junction resistance of the jointed portion may increase to resultantly disconnect. To solve this problem, a use of a high temperature solder having a high Pb ingredient rate is inevitable. However, there are problems that the high temperature solder having the high Pb ingredient rate deteriorates working atmosphere and the reliability is lowered because workability becomes extremely unfavorable.

Further, the jointing by fusing has deficiencies that the shape of a jointed portion and the junction resistance are not stabilized because the jointed portion is welded with pressure applied, and fatigue breakdown is apt to occur by vibration generated by the engine. When the lead conductors and the metallic terminal are jointed only by caulking, the strength and the junction resistance are not stabilized. As a substitute, for example, a device described in Japanese Unexamined Patent Publication JP-A-10-4646, can be mentioned. In this device, a focused terminal and an enameled copper wire are subjected to pressure resistance welding using a brazing filler metal on a jointed surface between the focus terminal and the enameled copper wire. However, because the melt point of brazing filler metal is high, a large amount of heat is required at a time of jointing these, the press time is elongated, and large electric power is required. Therefore, there are problems such that a part of the insulating coat which is unnecessary to remove by peeling is destroyed, whereby insulation is deteriorated and the strength and the vibration proof are deteriorated by the heat deterioration of a copper wire. Further, because the focused terminal is not entirely wrapped by the brazing filler metal or the like, rust is easily produced. Further, there are problems such that the productivity is deteriorated and the dimensions after welding are not stabilized because the focused terminal is not in a tubular form and therefore it is necessary to hold the copper wire before the welding. Thus this conventional technique is not always suitable as a jointing method for an AC generator for vehicle.

SUMMARY OF THE INVENTION

It is an object of the present invention to solve the above-mentioned problems inherent in the conventional technique and to provide a rotary electric machine and a method for producing the electric machine having sufficient insulation and excellent reliability of a jointed portion between a lead conductor of a stator coil and a joint terminal at a low cost, in which the jointed portion is not deteriorated by temperature, vibration and rust.

According to a first aspect of the present invention, there is provide a rotary electric machine comprising:

a lead wire having an insulating coating; and a joint terminal jointed to the lead wire, the joint terminal having a segue tubular hole and being provided with a jointing ancillary agent having a melting temperature the same as or less than a carbonization temperature of the insulating coating of the lead wire on its entire surface, wherein the lead wire inserted in the hole is welded to the joint terminal via the jointing ancillary agent, whereby the lead wire is easily inserted and held to thereby make productivity good; the reliability of connection in the jointed portion is improved; productivity, insulation and vibration proof are improved because the jointing portions to be jointed can be jointed within a short time; welding is finished within a short time without damaging the coil; the reliability of connection is further improved because the jointing ancillary agent is not easily ejected and remains in the jointed portion; and the reliability of connection in the joint terminal becomes good by preventing rust from being produced; and the cost is lowered by using the same material as the jointing ancillary agent.

According to a second aspect of the present invention, there is provided the rotary electric machine, wherein a recess is formed on an inner surface of the hole of the joint terminal along the outer periphery of the lead wire after the welding, whereby it is possible to obtain the rotary electric machine having a low junction resistance and high reliability.

According to a third aspect of the present invention, there is provided the rotary electric machine, wherein the jointing ancillary agent is tinning, whereby it is possible to easily plate at a low cost while making the joint firm and improving anticorrosive capability.

According to a fourth aspect of the present invention, there is provided the rotary electric machine, wherein the jointing ancillary agent is galvanization, whereby it is possible to easily plate at a low cost while making the joint firm and improving anticorrosive capability.

According to a fifth aspect of the present invention, there is provided the rotary electric machine, wherein the joint terminal is formed by rounding a conductive metallic plate in a tubular form and a butted portion is jointed using a brazing filler material having a melt point higher than the carbonization temperature of the insulating coating of the lead wire to form the tubular hole, whereby it is possible to easily change the diameter of the hole and make the reliability of the jointed portion high because the welding is tight and therefore the dimensions are stabilized.

According to a six aspect of the present invention, there is provided the rotary electric machine, wherein the brazing filler material for jointing the butted portion is a phosphor copper brazing filler, whereby it is possible to make the joint firm and the junction resistance small to enhance the reliability.

According to a seventh aspect of the present invention, there is provided the rotary electric machine, wherein the lead wire is jointed by welding at a temperature of the melt point of the brazing filler material for jointing the butted portion or less, whereby it is possible to make the junction resistance small and the jointing firm with high reliability, enhance productivity, and improve insulation and vibration proof.

According to an eighth aspect of the present invention, there is provided the rotary electric machine, wherein the lead wire is arranged in one row inside the hole of the joint terminal after the welding, whereby it is possible to make the joint strength high, the junction resistance small, and the reliability of the jointed portion high.

According to a ninth aspect of the present invention, there is provided the rotary electric machine, wherein the lead wire is arranged in two rows in an offsetting manner inside the hole of the joint terminal after the welding, whereby it is possible to miniaturize the machine and enhance the productivity.

According to a tenth aspect of the present invention, there is provided a method for producing a rotary electric machine comprising steps of:

forming a joint terminal having a segue tubular hole;

providing a jointing ancillary agent having a melting temperature of a carbonization temperature of an insulating coating on a lead wire jointed to the joint terminal or less on an entire surface of the joint terminal;

inserting the lead wire to the hole; and flattening the lead wire and the joint terminal by welding and jointing the lead wire to the joint terminal via the jointing ancillary agent, whereby the productivity is enhanced and the reliability of the jointed portion is improved.

According to an eleventh aspect of the present invention, there is provided the method for producing the rotary electric machine, wherein the step of forming the joint terminal having the segue tubular hole is rounding a conductive metallic plate in a tubular form and jointing a butted portion using a brazing filler material having a melt point higher than a carbonization temperature of the insulating coating of the lead wire, and forming the segue tubular hole, whereby it is possible to make the cost of the joint terminal low, stabilize the dimensions of the welded portion, and enhance the reliability of the jointed portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1a through 6 as follows, wherein the same numerical references are used for the same or similar portions and description of these portions is omitted.

Embodiment 1

Figure 1A:
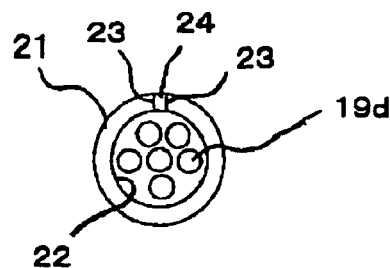
FIG. 1a illustrates a jointed state between a lead conductor and a joint terminal and a step of jointing these according to Embodiment 1 of the present invention.
Figure 1B:
FIG. 1b illustrates the jointed state between the lead conductor and the joint terminal and a step of jointing these according to Embodiment 1 of the present invention.
Figure 1B:
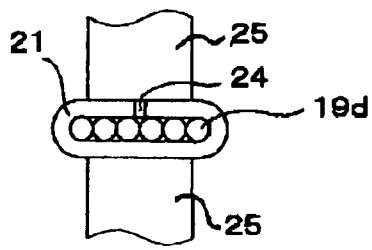
Figure 1C:
FIG. 1c illustrates the jointed state between the lead conductor and the joint terminal and a step of jointing these according to Embodiment 1 of the present invention.
Figure 1C:
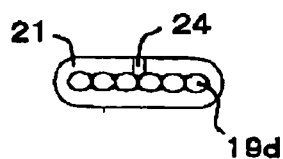
Figure 1D:
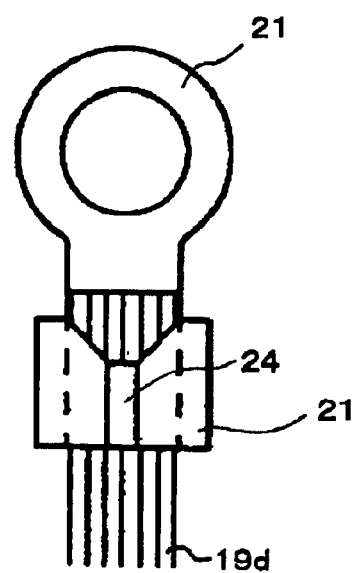
FIG. 1d illustrates the jointed state between the lead conductor and the joint terminal and a step of jointing these according to Embodiment 1 of the present invention.
Figure 2:
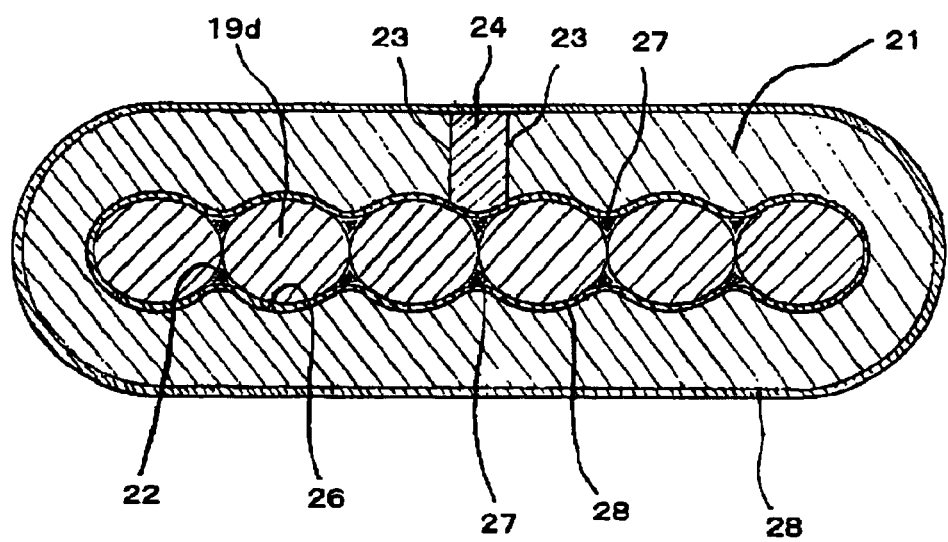
FIG. 2 is a cross-sectional view in a state that the lead conductor and the joint terminal are jointed after the welding shown in FIGS. 1a–1d.
Figure 5:
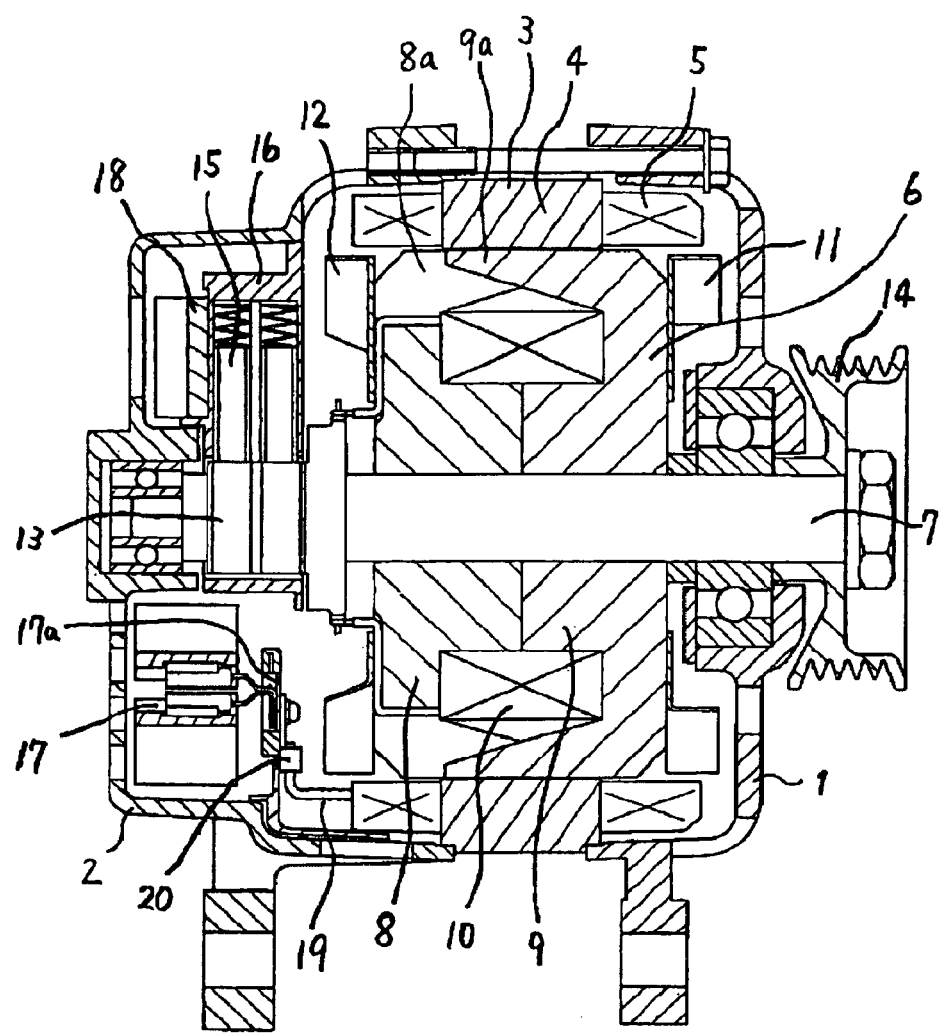
FIG. 5 is a cross-sectional view illustrating an entire structure of an AC generator for vehicle.
Figure 6:
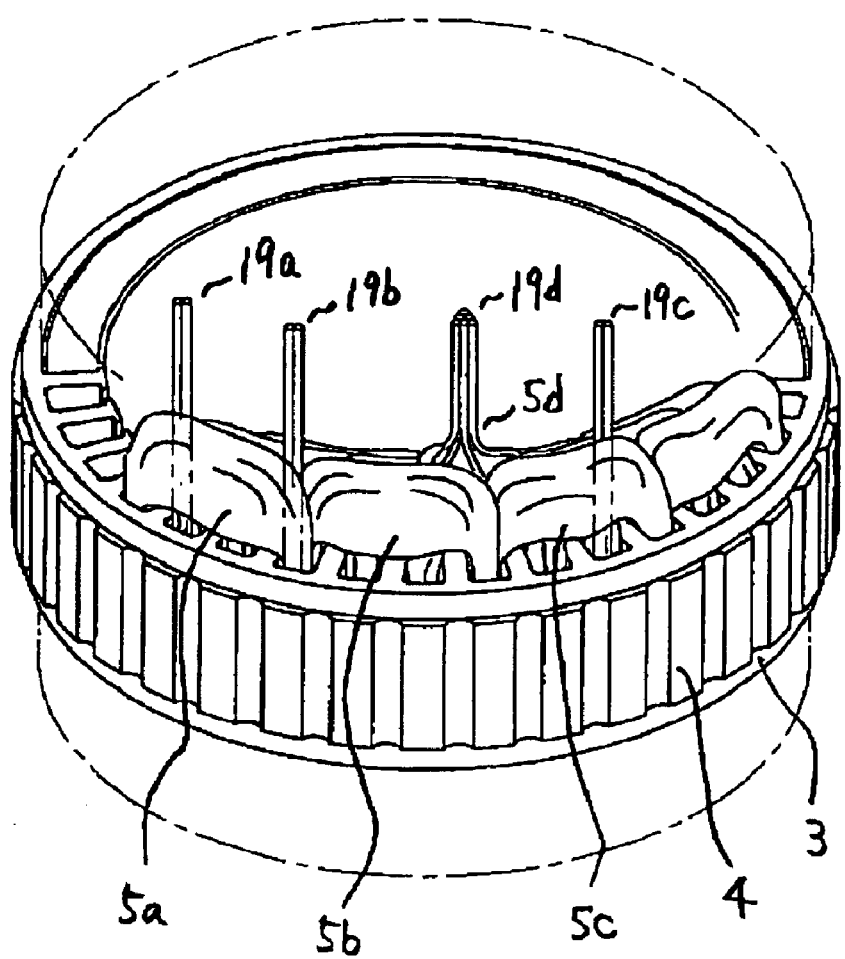
FIG. 6 is a perspective view illustrating a structure of a stator.

FIGS. 1a through 2, 5 and 6 illustrate an AC generator for vehicle according to Embodiment 1 and a method for producing the AC generator. FIGS. 1a through 1d illustrate for explaining a jointed state between a lead conductor of a stator coil and a joint terminal and a step of jointing these. FIG. 2 is a cross-sectional view for explaining the jointed state after welding these. FIG. 5 is a cross-sectional view illustrating an entire structure of an AC generator for vehicle. FIG. 6 is a perspective view illustrating a structure of stator. In FIG. 5, numerical reference 1 designates a front bracket; numerical reference 2 designates a rear bracket; numerical reference 3 designates a stator interposed and held between front bracket 1 and rear bracket 1 and including stator core 4 and stator coil 5; numerical reference 6 designates a rotor including rotational shaft 7 supported by front bracket 1 and rear bracket 2 at both ends, rotor cores 8 and 9 attached to rotational shaft 7, field coil 10 wound between rotor cores 8 and 9, fans 11 and 12 located on back surfaces of rotor cores 8 and 9, and slip ring 13 for supplying electric current to field coil 10, which is located in rotational shaft 7. Numerical reference 14 designates a pulley located in rotational shaft 7.

Numerical reference 15 designates a brush for supplying electric current to slip ring 13; numerical reference 16 designates a brush holder for holding brush 15; numerical reference 17 designates a three-phase full wave rectifier for rectifying AC output from stator coil 5; and numerical reference 18 designates a regulator for controlling output voltage from stator coil 5 by adjusting electric current in field coil 10. These components are attached to rear bracket 2. As illustrated in FIG. 6, stator coil 5 wound around and interposed in stator core 4 includes three-phase stator coils 5a, 5b and 5c and neutral point 5d. Lead conductors 19a, 19b, 19c and 19d respectively of stator coils 5a, 5b, 5c and 5d are elongated on the side of rear bracket, and joint terminals 20 are connected to their tip ends so as to be connected and fixed to terminal 17a of rectifier 17 as illustrated in FIG. 5. FIG. 6 illustrates a star connection type stator, lead conductor 19d opposite to stator coils 5a, 5b and 5c are connected in block so as to form neutral point 5d and welded to joint terminal 21 so as to be connected to rectifier 17 in a manner similar thereto.

In thus constructed AC generator for vehicle, rotor cores 8 and 9 are opposite to an inner peripheral portion of stator core 4 interposing a predetermined gap, and rotor cores 8 and 9 are arranged so as to be mutually engaged and respectively have magnetic pole pieces 8a and 9a, alternately magnetized to an opposite magnetic polarity. Field coil 10 is excited by a battery (not shown) through brushes 15 and slip ring 13. Then rotor 6 is driven by the engine through pulley 14 to generate a rotating field, three-phase AC power is generated in stator coil 5. The generated power is transformed to DC power by rectifier 17 to charge the battery. Then the power is supplied to loads (not shown).

Stator coils 5a, 5b and 5c on a path for supplying the power are lead wires having insulating coatings, wherein an insulating coating made from, for example, an amide-imide system is uniformly baked on an outer periphery of a copper wire. Lead conductors 19a, 19b and 19c are welded to join terminal 20 without removing the insulating coating. In a similar manner thereto, lead conductor 19d on the neutral point is welded to join terminal 21 without removing the insulating coating. FIGS. 1a through 1d illustrate a state that joint terminal 21 is jointed and the step of jointing this. FIG. 2 is a cross-sectional view illustrating the jointed state after the welding.

FIG. 1a illustrates the state that six lead conductors 19d are inserted in tubular hole 22 of joint terminal 21, wherein joint terminal 21 is made of a copper plate, hole 22 is formed by rounding the copper plate like a tube and jointing butted portion 23 using phosphor copper brazing filler 24 so as to be segue tubular hole 22, and thereafter tinning of a thickness of 5 µm is provided on the entire surface of joint terminal 21. FIG. 1b illustrates a state that pressure resistance welding is performed by applying electric current and pressure by electrodes 25 to the state illustrated in FIG. 1a, wherein the welding temperature is about 650° C., tubular hole 22 is flattened by the increased pressure and temperature six lead conductors 19d are arranged in one row in flattened hole 22. FIG. 1c is a cross-sectional view after the welding. FIG. 1d is a plan view of FIG. 1c. FIG. 2 is an enlarged view of FIG. 1c, wherein the jointed state after the welding is illustrated, wherein on the inner surface of hole 22 of joint terminal 21, recesses 26 are formed along the outer peripheries of lead conductors 19d, and lead conductors 19d are also subjected to plastic deformation to be in an elliptic shape. The carbonization temperature of the insulating coating made from the amide-imide system is about 600° C. Carbonized insulating coating 27 gathers gaps between lead conductors 19d and tin 28, and intervenes and remains between recesses 26 and lead conductors 19d, from which the insulating coating is removed. Because the melt point of phosphor copper brazing filler 24 is about 840° C. and the welding temperature is about 650° C., phosphor copper brazing filler 24 is not melted to keep the segue tubular state.

As described, according to Embodiment 1, since lead conductors 19d and joint terminal 21 jointed to lead conductors 19d are provided, joint terminal 21 has segue tubular hole 22, the tinning having the melting temperature less than the carbonization temperature of insulating coating 27 of lead conductor 19d is provided on the entire surface of joint terminal 21, and lead conductors 19d inserted in hole 22 are welded to joint terminal 21 via tin 28 as the ancillary agent to form segue tubular hole 22, lead conductors 19d are easily inserted and held to make the productivity good, the welded portion does not expand and are welded under the tightened state to thereby obtain strong calking force and stabilize the dimensions, whereby the joint is stabilized and the reliability of connection in the jointed portion is improved. Further, since tin 28 having the melting temperature of the carbonization temperature of insulating coating 27 or less is provided and the lead conductors are welded to joint terminal 21 via tin 28, it is unnecessary to unnecessarily increase the welding temperature, and requisite joints can be done within a short time, whereby the productivity, the insulation, and the vibration proof are improved. Further, since tin 28 as the ancillary agent easily conducts heat, peeling of insulating coating 27 is promoted, unnecessary increment of the welding temperature is avoidable, and the welding is done within a short time without damaging the coil.

Further, by a synergistic effect of tubular hole 22, tin 28 having a relatively low melting temperature is tightly jointed, and tin 28 is not easily ejected since the welding temperature can be made low, whereby tin 28 intervenes in the jointed portion to make the reliability of connection good. Further, since the tinning is provided on the entire surface of joint terminal 21, rust is not produced for a long time by rust proof function, the reliability of connection of joint terminal 21 becomes good. Further, since the same material as the jointing ancillary agent is used in the tinning, the cost can be made low. Especially, since the present invention is applied to the AC generator for vehicle, of which conditions such as temperature, vibration, rust proof, and cost are severe, it is possible to obtain the AC generator for vehicle having the good productivity and the reliable jointing portion.

Further, since recess 26 is formed along the outer peripheries of lead conductors 19d on the inner surface of hole 22 of joint terminal 21 after the welding, the contact area between lead conductors and joint terminal 21 increases, insulating coating 27 is easily ejected when recess 26 is formed by the plastic deformation, and the contact area with tin 28 as the jointing ancillary agent increases so that lead conductors 19d and joint terminal 21 are firmly jointed by tin 28 intervening the jointed portion, whereby the AC generator for vehicle having the low junction resistance and the high reliability is obtainable.

Further, since the jointing ancillary agent is the tinning, the plating is easily performed at a low cost, the joint becomes firm, and the rust proof is improved. An effect similar thereto is obtainable by using galvanization.

Since joint terminal 21 is formed by rounding the conductive metallic plate in a cylindrical tubular form and jointing butted portion 23 by brazing filler material 24 having the melt point higher than the carbonization temperature of insulating coating 27 of lead conductors 19d to form cylindrical tubular hole 22, it is possible to produce at a low cost in comparison with a case where hole 22 is made by a pipe, which does not have a joining portion, and it becomes easy to change the diameter of the hole for changing the size and the number of lead conductors 19d. Further, since phosphor copper brazing filler 24 having the melt point higher than the carbonization temperature of insulating coating 27 of lead conductors 19d is used as brazing filler material 24 for jointing butted portion 23, butted portion 23 is easily jointed and brazing filler material 24 does not melt at a time of welding, whereby the joint terminal is tightly welded to the lead conductors without changing the tubular shape and the dimensions are stabilized. Therefore, the AC generator for vehicle having the firm joint, the small junction resistance and the high reliability is obtainable.

Since lead conductors 19d are welded to join at a temperature of the melt point of brazing filler material 24 jointing butted portion 23 or less, brazing filler material 24 does not melt at a time of welding and is tightly welded in the tubular state, and the dimensions are stabilized, whereby the AC generator for vehicle having the firm joint, the small junction resistance, and the high reliability is obtainable. In addition, it is possible to joint within a short time without unnecessarily increasing the welding temperature so as to enhance the productivity, the insulation and the vibration proof are improved. The firm joint is also obtainable since the jointing ancillary agent intervenes between the joint surfaces.

Further, since lead conductors 19d are arranged in one row inside hole 22 of joint terminal 21 after the welding, the contact areas between lead conductors 19d and joint terminal 21 become large, whereby the AC generator for vehicle having the strong jointing strength, the small junction resistance, and the high reliability of the jointed portion is obtainable.

Further, according to the method for producing the AC generator for vehicle according to Embodiment 1, the step of forming joint terminal 21 having segue tubular hole 22; the step of providing tin 28 having the melting temperature or less of the carbonization temperature of insulating coating 27 of lead conductors 19d for joining to joint terminal 21; the step of inserting lead conductors 19d into hole 22; and the step of flattening lead conductors 19d and joint terminal 21 by welding and jointing lead conductors 19d to joint terminal 21 via tin 28 are included. Therefore, the productivity is improved and the reliability of the jointed portion is high. In particular, since the step of forming joint terminal 21 having segue tubular hole 22 is conducted by rounding the conductive metallic plate in the tubular form and jointing butted portion 23 by brazing filler material 24 having the melt point higher than the carbonization temperature of insulating coating 27 of lead conductors 19d, the cost of joint terminal 21 can be made low, and brazing filler material 24 does not melt at a time of welding so as to be tightly welded in the state of the tubular form and stabilizes the dimensions, whereby the method for producing the AC generator for vehicle having the firm joint, the small junction resistance and the high reliability is obtainable at the low cost.

Embodiment 2

Figure 3A:
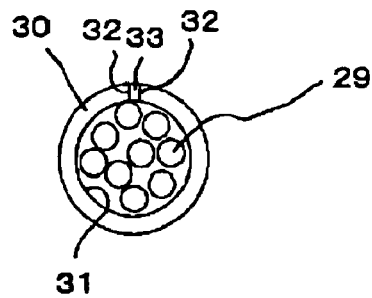
FIG. 3a illustrates a jointed state between a lead conductor and a joint terminal and a step of jointing these according to Embodiment 2 of the present invention.
Figure 3B:
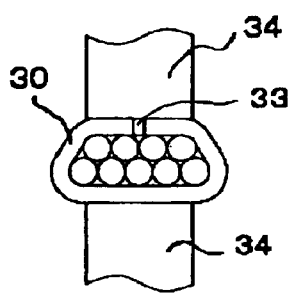
FIG. 3b illustrates the jointed state between the lead conductor and the joint terminal and a step of jointing these according to Embodiment 2 of the present invention.
Figure 3C:
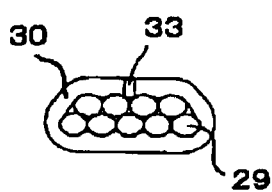
FIG. 3c illustrates the jointed state between the lead conductor and the joint terminal and a step of jointing these according to Embodiment 2 of the present invention.
Figure 3D:
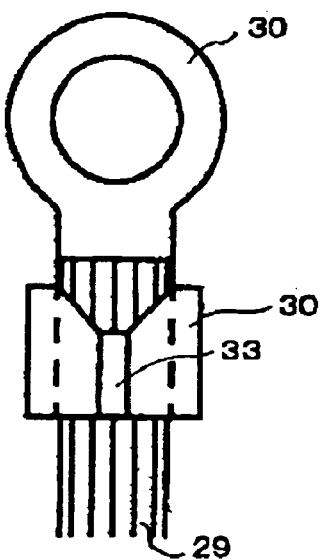
FIG. 3d illustrates the jointed state between the lead conductor and the joint terminal and a step of jointing these according to Embodiment 2 of the present invention.
Figure 4:
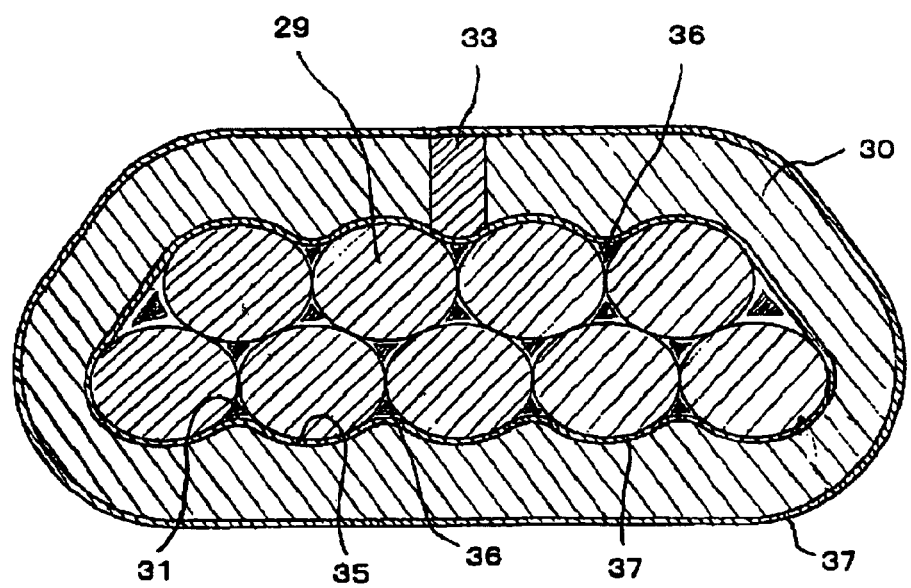
FIG. 4 is a cross-sectional view illustrating the jointed state after the welding shown in FIGS. 3a–3d.

FIGS. 3a to 4 illustrate an AC generator for vehicle and the method for producing the AC generator according to Embodiment 2 of the present invention. FIGS. 3a through 3d illustrate a state of joining lead conductors 29 of a stator coil to joint terminal 30 and the step of jointing these. FIG. 4 is a cross-sectional view for illustrating the jointed state after welding, wherein the number of lead conductors 29 is nine in comparison with Embodiment 1. In FIG. 3a, a state that nine lead conductors 29 are inserted in cylindrical tubular hole 31 of joint terminal 30, wherein joint terminal 30 is made of a copper plate, hole 31 is the segue cylindrical tubular hole formed by rounding the copper plate in a cylindrical tubular form and jointing butted portion 32 by phosphor copper brazing filler 33, and thereafter the entire surface of joint terminal 30 is subjected to galvanization. FIG. 3b illustrates a state that the state illustrated in FIG. 3a is subjected to pressure resistance welding by applying pressure and electric current by electrodes 34, wherein the welding temperature is about 650° C., and cylindrical tubular hole 31 is flattened by the increased pressure and temperature, and therefore nine lead conductors 29 are arranged in two rows in flattened hole 31 in an offsetting manner. FIG. 3c is a cross-sectional view after the welding. FIG. 3d is a plan view of FIG. 3c. FIG. 4 is an enlarged view of FIG. 3c, wherein the jointed state after the welding is illustrated. On the inner surface of hole 31 of joint terminal 30, recesses 35 along outer peripheries of lead conductors 29 are formed and lead conductors 29 are also subjected to plastic deformation to be in an ellipse shape. Further, the carbonization temperature of an insulating coating made from an amide-imide system is about 600° C., carbonized insulating coating 36 gathers in gaps between lead conductors, and zinc 37 intervenes and remains between recesses 35 and lead conductors 29, from which the insulating coating is removed. Further, the melt point of phosphor copper brazing filler 33 is about 840° C. and the welding temperature is about 650° C., phosphor copper brazing filler 33 does not melt so as to keep the segue tubular state.

As described, according to Embodiment 2, since lead conductors 29 are arranged in two rows in hole 31 of joint terminal 30 in the offsetting manner, it is possible to reduce the width of the welded portion in comparison with a case of one row. Even though the number of lead conductors 29 increases, because the width of the welded portion scarcely changes, peripheral components can be diverted, whereby the small-sized AC generator for vehicle having the highly reliable joint is obtainble at a low cost.

Although the case where hole 31 is formed by jointing butted portion 32 by brazing filler material 33 has been described, when the joint terminal is made of a pipe it is unnecessary to joint the butted portion by the brazing filler material, whereby an effect similar to described above can be demonstrated. However, the cost for jointing the butted portion by the brazing filler material is lower than the case of using the pipe, and the changes of the sizes and the number of lead conductors 29 to change the diameter of the hole become easier than in the case of using the pipe.

Further, although the case of the lead conductors having the circular cross-sectioned shape has been described, the present invention is applicable to lead conductors having a quadrangle cross sectional shape such as a rectangular.

Further, although the case of applying to the AC generator for vehicle has been described, the invention is applicable to, for example, a rotary electric machine having dual functions of engine starting motor and AC generator.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2002-003477 filed on Jan. 10, 2002 including specification, claims, drawings and summary are incorporated herein by reference in its entirety.

What is claimed is:

1. A rotary electric machine comprising:
   a lead wire having an insulating coating; and
   a joint terminal jointed to the lead wire, the joint terminal having a tubular form, surfaces of the joint terminal being provided with a jointing ancillary agent having a melting temperature equal to or less than the carbonization temperature of the insulating coating of the lead wire,
   wherein the lead wire inserted in the tubular form is welded to the joint terminal a the jointing ancillary agent, and wherein the joint terminal is formed by rounding a conductive metallic plate into said tubular form, a butted portion thereof being jointed using a brazing filler material having a melt point higher than the carbonization temperature of the insulating coating of the lead wire.

2. The rotary electric machine according to claim 1, wherein a recess is formed on an inner surface of the hole of the joint terminal along the outer periphery of the lead wire, after said welding.

3. The rotary electric machine according to claim 1, wherein the jointing ancillary agent is a tin film formed by tinning.

4. The rotary electric machine according to claim 2, wherein the jointing ancillary agent is a tin film formed by linning.

5. The rotary electric machine according to claim 1, wherein the jointing ancillary agent is a zinc film formed by galvanization.

6. The rotary electric machine according to claim 2, wherein the jointing ancillary agent is a zinc film formed by galvanization.

7. The rotary electric machine according to claim 1, wherein the brazing filler material for jointing the butted portion is a phosphor copper brazing filler.

8. The rotary electric machine according to claim 1, wherein the lead wire is jointed by welding at a temperature which is equal to or less than a melt point of the brazing filler material for jointing the butted portion.

9. The rotary electric machine according to claim 1, wherein the lead wire is arranged in one row inside the hole of the joint terminal after said welding.

10. The rotary electric machine according to claim 8, wherein the lead wire is arranged in one row inside the hole of the joint terminal after said welding.

11. The rotary electric machine according to claim 1, wherein the lead wire is arranged in two rows in an offsetting manner inside the hole of the joint terminal after said welding.

12. The rotary electric machine according to claim 8, wherein the lead wire is arranged in two rows in an offsetting manner inside the hole of the joint terminal after said welding.

13. A method for producing a rotary electric machine comprising steps of:
   forming a joint terminal having a tubular opening;
   providing a jointing ancillary agent having a melting temperature of less than or equal to a carbonization temperature of an insulating coating on a lead wire jointed to the joint terminal, on an entire surface of the joint terminal;
   inserting the lead wire into said tubular opening; and
   flattening the lead wire and the joint terminal by welding and jointing the lead wire to the joint terminal via the jointing ancillary agent, and wherein the step of forming the joint terminal having the tubular opening comprises rounding a conductive metallic plate into a tubular form, and jointing a butted portion thereof using a brazing filler material having a melt joint higher than a carbonization temperature of the insulating coating of the lead wire.

14. The rotary electric machine according to claim 7, wherein the lead wire is jointed by welding at a temperature which is equal to or less than a melt point of the brazing filler material for jointing the butted portion.

15. The rotary electric machine according to claim 7, wherein the lead wire is arranged in one row inside the hole of the joint terminal after said welding.

16. The rotary electric machine according to claim 7, wherein the lead wire is arranged in two rows in an offsetting manner inside the hole of the joint terminal after said welding.

* * * * *